United States Patent
Smith et al.

(10) Patent No.: US 10,530,648 B2
(45) Date of Patent: *Jan. 7, 2020

(54) APPARATUS AND METHODS FOR MAINTAINING SERVICE CONTINUITY WHEN TRANSITIONING BETWEEN MOBILE NETWORK OPERATORS

(71) Applicant: AT&T Intellectual Property I, L.P., Atlanta, GA (US)

(72) Inventors: David K. Smith, Issaquah, WA (US); Dan Druta, Sammamish, WA (US); Ileana A. Leuca, Bellevue, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,988

(22) Filed: Jun. 11, 2018

(65) Prior Publication Data

US 2018/0295024 A1 Oct. 11, 2018

Related U.S. Application Data

(63) Continuation of application No. 15/495,551, filed on Apr. 24, 2017, now Pat. No. 10,020,992, which is a
(Continued)

(51) Int. Cl.
*H04W 4/50* (2018.01)
*H04W 88/06* (2009.01)
(Continued)

(52) U.S. Cl.
CPC ....... *H04L 41/0816* (2013.01); *H04B 1/3816* (2013.01); *H04L 41/0803* (2013.01);
(Continued)

(58) Field of Classification Search
None
See application file for complete search history.

(56) References Cited

U.S. PATENT DOCUMENTS 5,943,619 A 8/1999 Coyne et al.
6,157,378 A 12/2000 Bormann et al.
(Continued)

FOREIGN PATENT DOCUMENTS

WO 2011020405 A1 2/2011
WO 2012076464 A1 6/2012

OTHER PUBLICATIONS

GSMA, "Embedded SIM Task Force Requirements and Use Cases", Feb. 21, 2011.
(Continued)

*Primary Examiner* — Joshua Joo
(74) *Attorney, Agent, or Firm* — Guntin & Gust, PLC; Jay Anderson

(57) ABSTRACT

A system that incorporates teachings of the subject disclosure may include, for example, a method storing, at an integrated circuit card including at least one processor, parametric information descriptive of operational features of a plurality of software applications, where the plurality of software applications when executed makes use of services provided by equipment of a first network operator. The method can further include detecting, at the integrated circuit card, an event indicating that the plurality of software applications are to utilize services provided by equipment of a second network operator, and causing, from the integrated circuit card, a transmission of the parametric information descriptive of the operational features of the plurality of software applications to the equipment of the second network operator. Other embodiments are disclosed.

20 Claims, 6 Drawing Sheets

Related U.S. Application Data continuation of application No. 15/249,645, filed on Aug. 29, 2016, now Pat. No. 9,686,135, which is a continuation of application No. 14/747,576, filed on Jun. 23, 2015, now Pat. No. 9,455,869, which is a continuation of application No. 13/470,979, filed on May 14, 2012, now Pat. No. 9,094,774.

(51) Int. Cl.
    *H04L 12/24* (2006.01)
    *H04W 4/60* (2018.01)
    *H04B 1/3816* (2015.01)

(52) U.S. Cl.
    CPC ............ *H04W 4/50* (2018.02); *H04W 4/60* (2018.02); *H04W 88/06* (2013.01)

(56) References Cited

U.S. PATENT DOCUMENTS

| | | |
|---|---|---|
| 8,171,525 B1 | 5/2012 | Pelly et al. |
| 8,396,011 B2 | 3/2013 | Carolan et al. |
| 8,412,933 B1 | 4/2013 | Pelly et al. |
| 8,429,409 B1 | 4/2013 | Wall et al. |
| 8,554,175 B2 | 10/2013 | Pecen et al. |
| 8,724,625 B2 | 5/2014 | Carolan et al. |
| 8,800,015 B2 | 8/2014 | Tardelli et al. |
| 8,843,179 B2 | 9/2014 | Li et al. |
| 2003/0153135 A1 | 8/2003 | Kim et al. |
| 2004/0042442 A1 | 3/2004 | Pecen et al. |
| 2004/0236702 A1 | 11/2004 | Fink et al. |
| 2004/0240450 A1 | 12/2004 | Turcanu et al. |
| 2005/0021875 A1 | 1/2005 | Bouthemy et al. |
| 2005/0114870 A1* | 5/2005 | Song ............... G06F 21/52 719/328 |
| 2005/0273499 A1 | 12/2005 | Goodman et al. |
| 2006/0020692 A1 | 1/2006 | Jaffray et al. |
| 2006/0153135 A1 | 7/2006 | Ascolese et al. |
| 2006/0205434 A1 | 9/2006 | Tom et al. |
| 2006/0235796 A1 | 10/2006 | Johnson et al. |
| 2007/0011704 A1 | 1/2007 | Anglin |
| 2007/0180488 A1 | 8/2007 | Walter |
| 2007/0234397 A1 | 10/2007 | Pearson |
| 2008/0051076 A1* | 2/2008 | O'Shaughnessy .... G06F 21/305 455/419 |
| 2008/0146223 A1 | 6/2008 | Welnick et al. |
| 2008/0148336 A1 | 6/2008 | Walter |
| 2008/0261561 A1 | 10/2008 | Gehrmann |
| 2009/0061840 A1* | 3/2009 | Fleischman ......... H04L 41/0809 455/419 |
| 2009/0077643 A1 | 3/2009 | Schmidt |
| 2009/0158344 A1 | 6/2009 | Anglin, Jr. |
| 2009/0205028 A1 | 8/2009 | Smeets et al. |
| 2009/0209232 A1 | 8/2009 | Cha |
| 2009/0215431 A1 | 8/2009 | Koraichi |
| 2009/0282251 A1 | 11/2009 | Cook et al. |
| 2010/0048255 A1 | 2/2010 | Jojivet et al. |
| 2010/0138856 A1 | 6/2010 | Anglin, Jr. |
| 2010/0190475 A1 | 7/2010 | El-Kadri et al. |
| 2010/0255819 A1 | 10/2010 | Robles |
| 2010/0313251 A1 | 12/2010 | Carolan et al. |
| 2011/0088028 A1 | 4/2011 | Tofighbakhsh et al. |
| 2011/0092253 A1 | 4/2011 | Amiel |
| 2011/0202641 A1 | 8/2011 | Kahn et al. |
| 2011/0246978 A1 | 10/2011 | Alfano et al. |
| 2011/0256896 A1 | 10/2011 | Giaretta et al. |
| 2011/0314287 A1 | 12/2011 | Escott et al. |
| 2011/0320579 A1 | 12/2011 | Takeuchi |
| 2012/0054841 A1 | 3/2012 | Schultz et al. |
| 2012/0072979 A1 | 3/2012 | Cha |
| 2012/0108295 A1 | 5/2012 | Schell et al. |
| 2012/0129500 A1 | 5/2012 | Rajadurai et al. |
| 2012/0142278 A1 | 6/2012 | Wang et al. |
| 2012/0190354 A1 | 7/2012 | Merrien et al. |
| 2012/0282891 A1 | 11/2012 | Mohammed et al. |
| 2012/0304254 A1 | 11/2012 | Musfeldt et al. |
| 2012/0304255 A1 | 11/2012 | Carnes |
| 2012/0311064 A1 | 12/2012 | Deo |
| 2013/0012185 A1 | 1/2013 | Lavi et al. |
| 2013/0065551 A1 | 3/2013 | Raleigh et al. |
| 2013/0078949 A1 | 3/2013 | Pecen et al. |
| 2013/0097682 A1 | 4/2013 | Zeljkovic et al. |
| 2013/0117805 A1 | 5/2013 | Kent et al. |
| 2013/0138959 A1 | 5/2013 | Pelly et al. |
| 2013/0165075 A1 | 6/2013 | Rishy-Maharaj et al. |
| 2013/0183932 A1 | 7/2013 | Lemilainen et al. |
| 2013/0198822 A1 | 8/2013 | Hitchcock et al. |
| 2013/0205360 A1 | 8/2013 | Novak et al. |
| 2013/0212384 A1 | 8/2013 | Pelly et al. |
| 2013/0225123 A1 | 8/2013 | Adjakple et al. |
| 2013/0226627 A1 | 8/2013 | Kubovcik et al. |
| 2013/0227656 A1 | 8/2013 | Holtmanns et al. |
| 2013/0231087 A1 | 9/2013 | O'Leary |
| 2013/0247163 A1 | 9/2013 | Ganem |
| 2013/0267199 A1 | 10/2013 | Kamal et al. |
| 2013/0273889 A1 | 10/2013 | Lobmaier |
| 2013/0273911 A1 | 10/2013 | Mohammed et al. |
| 2013/0310011 A1 | 11/2013 | Midkiff et al. |
| 2013/0329683 A1 | 12/2013 | Berard et al. |
| 2013/0337803 A1 | 12/2013 | Christopher et al. |
| 2013/0340059 A1 | 12/2013 | Christopher et al. |
| 2014/0019760 A1 | 1/2014 | Vergnes et al. |
| 2014/0295830 A1 | 10/2014 | Oerton |
| 2016/0366018 A1 | 12/2016 | Smith |
| 2017/0006466 A1 | 1/2017 | Midkiff |
| 2017/0006467 A1 | 1/2017 | Christopher et al. |
| 2017/0118628 A1 | 4/2017 | Christopher et al. |
| 2017/0230243 A1 | 8/2017 | Smith |
| 2017/0238170 A1* | 8/2017 | Jokinen ................. H04W 8/22 709/203 |
| 2018/0139603 A1 | 5/2018 | Midkiff |
| 2018/0295502 A1 | 10/2018 | Christopher et al. |

OTHER PUBLICATIONS

Paterno, Giuseppe, "Enhanced SIM (ESIM): a proposal for mobile security", Centre for Telecommunications Value-Chain Research, Trinity College Dublin, Sep. 2009, 4 pages.

\* cited by examiner

APPARATUS AND METHODS FOR MAINTAINING SERVICE CONTINUITY WHEN TRANSITIONING BETWEEN MOBILE NETWORK OPERATORS

CROSS-REFERENCE TO RELATED APPLICATIONS

This application is a continuation of U.S. application Ser. No. 15/495,551, filed Apr. 24, 2017, which is a continuation of U.S. application Ser. No. 15/249,645, filed Aug. 29, 2016 (now U.S. Pat. No. 9,686,135), which is a continuation of U.S. application Ser. No. 14/747,576, filed Jun. 23, 2015 (now U.S. Pat. No. 9,455,869), which is a continuation of U.S. application Ser. No. 13/470,979, filed May 14, 2012 (now U.S. Pat. No. 9,094,774), which are incorporated by reference herein in their entirety.

FIELD OF THE DISCLOSURE

The subject disclosure relates generally to an apparatus and methods for maintaining service continuity when transitioning between mobile network operators.

BACKGROUND

Mobile Network Operators (MNOs) generally provide each subscriber a Universal Integrated Circuit Card (UICC), commonly known as a Subscriber Identity Module or SIM card, which enables authentication and access to a mobile network and provides identifiers that allow equipment of the MNO to account for service usage and to bill the subscriber accordingly. The SIM card is removable by the subscriber and can be inserted in any compatible device, providing continuity of network access service from device to device. A user can switch to another MNO by physically swapping SIM cards in their device.

In an environment involving machine-to-machine communications, it is common for a UICC to be placed in harsh environments such as a communication device located in an automobile engine, or atop a streetlight, which is not easily accessible. In such applications the UICC is often embedded in the communication device and not physically replaceable. When a subscriber of a device utilizing an embedded UICC wishes to switch to another MNO, the subscriber may have to replace the device if the embedded UICC is not configured to be re-provisioned.

BRIEF DESCRIPTION OF THE DRAWINGS

Reference will now be made to the accompanying drawings, which are not necessarily drawn to scale, and wherein.

DETAILED DESCRIPTION

Figure 1:
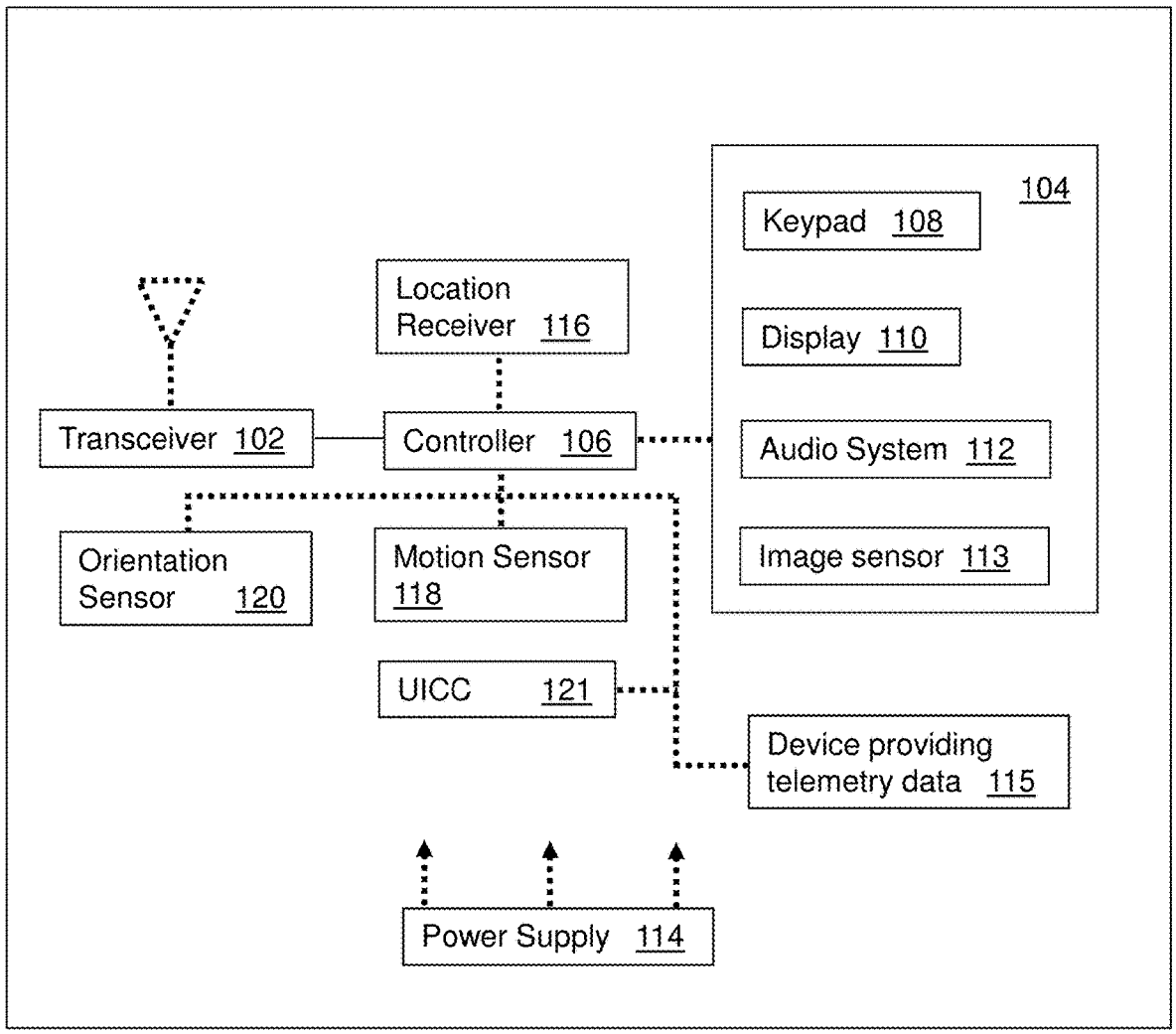
FIG. 1 depicts an illustrative embodiment of a communication device.

The subject disclosure describes, among other things, illustrative embodiments for transitioning from one MNO to another MNO in a manner that provides continuity of services to software applications supported by the UICC without replacing the UICC. Other embodiments are contemplated by the subject disclosure.

One embodiment of the subject disclosure includes a UICC having a memory storing computer instructions, and a processor coupled to the memory. The processor responsive to executing the computer instructions can perform operations including storing parametric information descriptive of operational features of a plurality of software applications executable by the UICC or a device communicatively coupled to the UICC, where the plurality of software applications when executed makes use of services provided by equipment of a first MNO. When executing the computer instructions, the processor can also perform operations including detecting an event indicating that the plurality of software applications are to utilize services provided by equipment of a second MNO, transmitting to the equipment of the second MNO the parametric information descriptive of the operational features of the plurality of software applications to configure the services provided by the equipment of the second MNO to interoperate with the plurality of software applications when executed, and causing or enabling execution of a first software application of the plurality of software applications to interact with at least one of the configured services provided by the equipment of the second MNO.

One embodiment of the subject disclosure includes a computer-readable storage medium including computer instructions which, responsive to being executed by at least one processor of a UICC, cause at least one processor to perform operations including storing parametric information descriptive of operational features of a plurality of software applications, where the plurality of software applications when executed makes use of services provided by equipment of a first network operator. When executing the computer instructions, at least one processor can also perform operations including detecting an event indicating that the plurality of software applications are to utilize services provided by equipment of a second network operator, and transmitting to the equipment of the second network operator the parametric information descriptive of the operational features of the plurality of software applications to configure the services provided by the equipment of the second network operator to interoperate with the plurality of software applications.

One embodiment of the subject disclosure includes a method for storing, at an integrated circuit card including at least one processor, parametric information descriptive of operational features of a plurality of software applications, where the plurality of software applications when executed makes use of services provided by equipment of a first network operator. The method can further include detecting, at the integrated circuit card, an event indicating that the plurality of software applications are to utilize services provided by equipment of a second network operator, and causing, from the integrated circuit card, a transmission of the parametric information descriptive of the operational features of the plurality of software applications to the equipment of the second network operator.

FIG. 1 depicts an illustrative embodiment of a communication device 100. The communication device 100 can represent a number of possible device types such as, for example, a cellular telephone, a personal digital assistance, a smart phone, a tablet, a portable computer such as a laptop, an industrial device for providing telemetry information to a central station for monitoring, diagnostics, mitigation or other suitable functions. Multiple variants of the communication device 100 are thus contemplated by the subject disclosure.

The communication device 100 can comprise a wireline and/or wireless transceiver 102 (herein transceiver 102), a user interface (UI) 104, a power supply 114, a location receiver 116, a motion sensor 118, an orientation sensor 120, a UICC 121, and a controller 106 for interacting with or managing operations thereof. The transceiver 102 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 102 can also be adapted to support circuit-switched wireline access technologies (such as Public Switched Telephone Network or PSTN), packet-switched wireline access technologies (such as TCP/IP, VoIP, IP Multimedia Subsystems or IMS, etc.), and combinations thereof.

The UI 104 can include a depressible or touch-sensitive keypad 108 with a navigation mechanism such as a roller ball, a joystick, a mouse, or a navigation disk for manipulating operations of the communication device 100. The keypad 108 can be an integral part of a housing assembly of the communication device 100 or an independent device communicatively coupled thereto by a tethered wireline interface (such as a USB cable) or a wireless interface supporting for example Bluetooth. The keypad 108 can represent a numeric keypad commonly used by phones, and/or a QWERTY keypad with alphanumeric keys.

The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is touch-sensitive, a portion or all of the keypad 108 can be presented by way of the display 110 with navigation features. The display 110 can be an integral part of the housing assembly of the communication device 100 or an independent device communicatively coupled to the communication device 100 by a tethered wireline interface (such as a cable) or a wireless interface.

The UI 104 can also include an audio system 112 that utilizes common audio technology for conveying low volume audio (such as audio heard only in the proximity of a human ear) and high volume audio (such as speakerphone for hands free operation). The audio system 112 can further include a microphone for receiving audible signals of an end user. The audio system 112 can also be used for voice recognition applications. The UI 104 can further include an image sensor 113 such as a charged coupled device (CCD) camera for capturing still or moving images.

The power supply 114 can utilize common power management technologies such as replaceable and rechargeable batteries, supply regulation technologies, and/or charging system technologies for supplying energy to the components of the communication device 100 to facilitate long-range or short-range portable applications. Alternatively, the charging system can utilize external power sources such as DC power supplied over a physical interface such as a USB port or other suitable tethering technologies.

The location receiver 116 can utilize location technology such as a global positioning system (GPS) receiver capable of assisted GPS for identifying a location of the communication device 100 based on signals generated by a constellation of GPS satellites, which can be used for facilitating location services such as navigation. The motion sensor 118 can utilize motion sensing technology such as an accelerometer, a gyroscope, or other suitable motion sensing technology to detect motion of the communication device 100 in three-dimensional space. The orientation sensor 120 can utilize orientation sensing technology such as a magnetometer to detect the orientation of the communication device 100 (north, south, west, and east, as well as combined orientations in degrees, minutes, or other suitable orientation metrics).

The UICC 121 can be utilized for storing data to enable the communication device 100 to, among other things, establish communications with a communication network such as a cellular base station, support enablement of software applications stored in the UICC or a memory of the communication device 100 that makes use of services provided by the communication network. The data stored in the UICC 121 can include, for example, an International Mobile Subscriber Identity (IMSI), a personal phone book, executable software applications purchased by the subscriber, a mapping of services between the software applications and services of a communication network, MNO policy files, and other information as will be described below.

Depending on the communication protocol or the applicable use of the UICC 121, the UICC 121 can be referred to as a subscriber identity module (SIM), a Removable User Identity Module (RUIM), an embedded UICC (eUICC), an embedded SIM (eSIM), and so on. An eUICC or eSIM can represent UICC devices that are integrated by soldering the device onto a printed circuit board of the communication device 100, by attaching the device to a housing assembly of the communication 100, or by software integration of the UICC functions in an existing processor of the communication device 100. Present and next generation physical and operational variants of the UICC 121 are contemplated by the present disclosure.

The controller 106 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communication device 100.

The controller 106 can be communicatively coupled to a device 115 that can supply telemetry data (e.g., an automobile, a utility meter, etc.). In one embodiment, the communication device 100 can be an integral part of the device 115. In another embodiment, the communication device 100 can be co-located and communicatively coupled to the device 115 by way of a physical or wireless communication interface.

Figure 2:
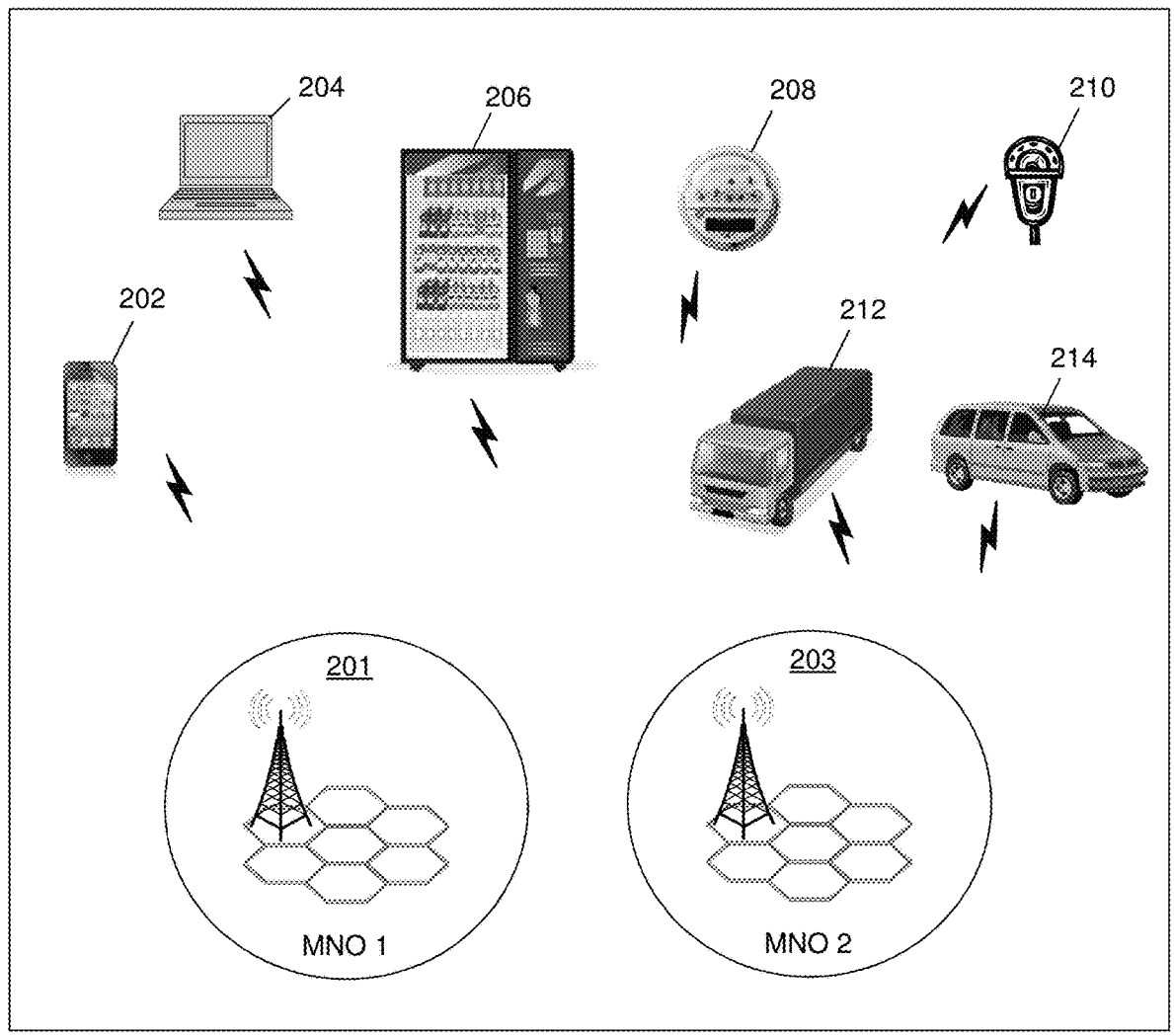
FIG. 2 depicts an illustrative embodiment of a system including mobile network operators (MNOs) and communication devices communicatively coupled thereto.

FIG. 2 depicts a system 200 with illustrative embodiments of the communication device 100. In one embodiment, the communication device 100 can represent a consumer device such as a cellular telephone 202, a computer or laptop 204. In a commercial setting, the communication device 100 can be communicatively coupled to a vending machine 206, a utility meter 208, a parking meter 210, a commercial transport vehicle 212, or an automobile 214. In these latter embodiments, the UICC 121 can be an embedded (non-removable) device. The embodiments of the communication device 100 shown in FIG. 2 can be operable to facilitate establishment of communications with mobile network operator (MNO) 201 or MNO 203. MNO 201 and MNO 203 can operate according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on.

MNO 201 or MNO 203 provide wireless communication services to subscriber devices in large regions such as cities, states, and nationally. MNO 201 and MNO 203 are generally independently operated businesses. Consequently, the services provided by MNO 201 and MNO 203 may differ in ways that may cause interoperability issues when the software applications supported by UICC 121 of a communication device 100 attempt to utilize the services of a new MNO.

Figure 3:
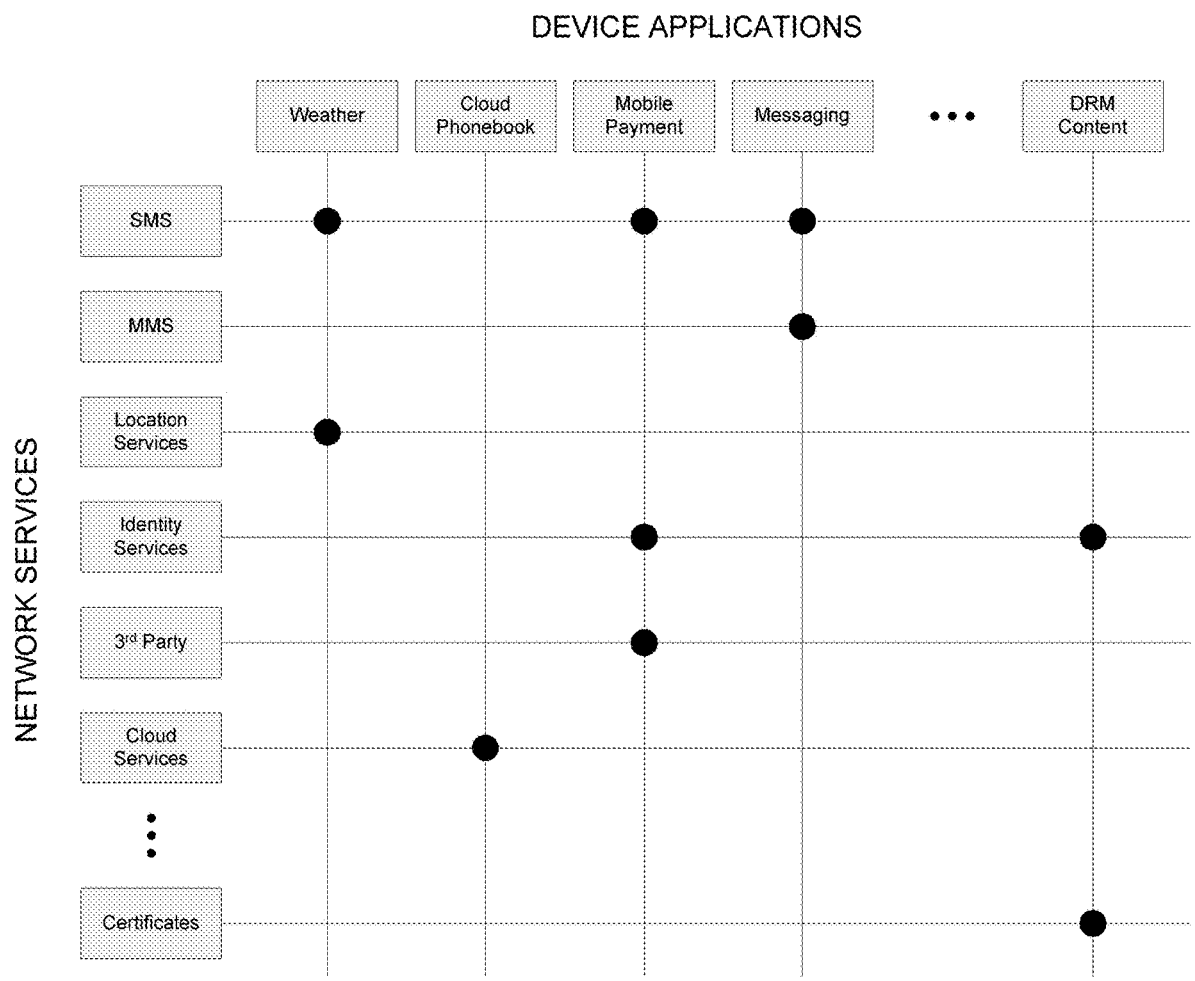
FIG. 3 depicts an illustrative embodiment of a mapping of services provided by the MNOs and software applications operating from one or more of the communication devices of FIG. 2.

FIG. 3 depicts an illustrative embodiment of a mapping of services provided by the MNOs to software applications operating from the communication devices of FIG. 2. MNO services can include, for example, text messaging services such as Short Messaging Service (SMS), multimedia messaging such as Multimedia Messaging Service (MMS), location services, identity services, third party services, cloud services, and authentication services by way of public key infrastructure (PKI) certificates, just to mention a few. Software applications executed from the communication devices of FIG. 2 can make use of the MNO services. For example, a software application for tracking weather can make use of SMS messages for alerts, and location services to identify weather conditions relative to the location of the communication device. Cloud phonebook software applications can utilize Cloud services of the MNO (e.g., an enterprise directory or personal directories stored on a webserver).

Mobile payment or ecommerce services can make use of SMS messaging, identity services, and third party services (e.g., PayPal™). Subscriber to subscriber messaging applications can make use of SMS and MMS messaging. Protected content that relies on Digital Rights Management (DRM) rules can make use of identify services and PKI certificate services of the MNO. In a commercial setting where telemetry data or other useful metrics are being monitored by commercial enterprises, such enterprises may have arrangements with the MNO to link subscriber devices in the field (e.g., at a vending machine, utility meter, etc. as shown in FIG. 2) with processing devices of the commercial enterprise such as servers.

Figure 4:
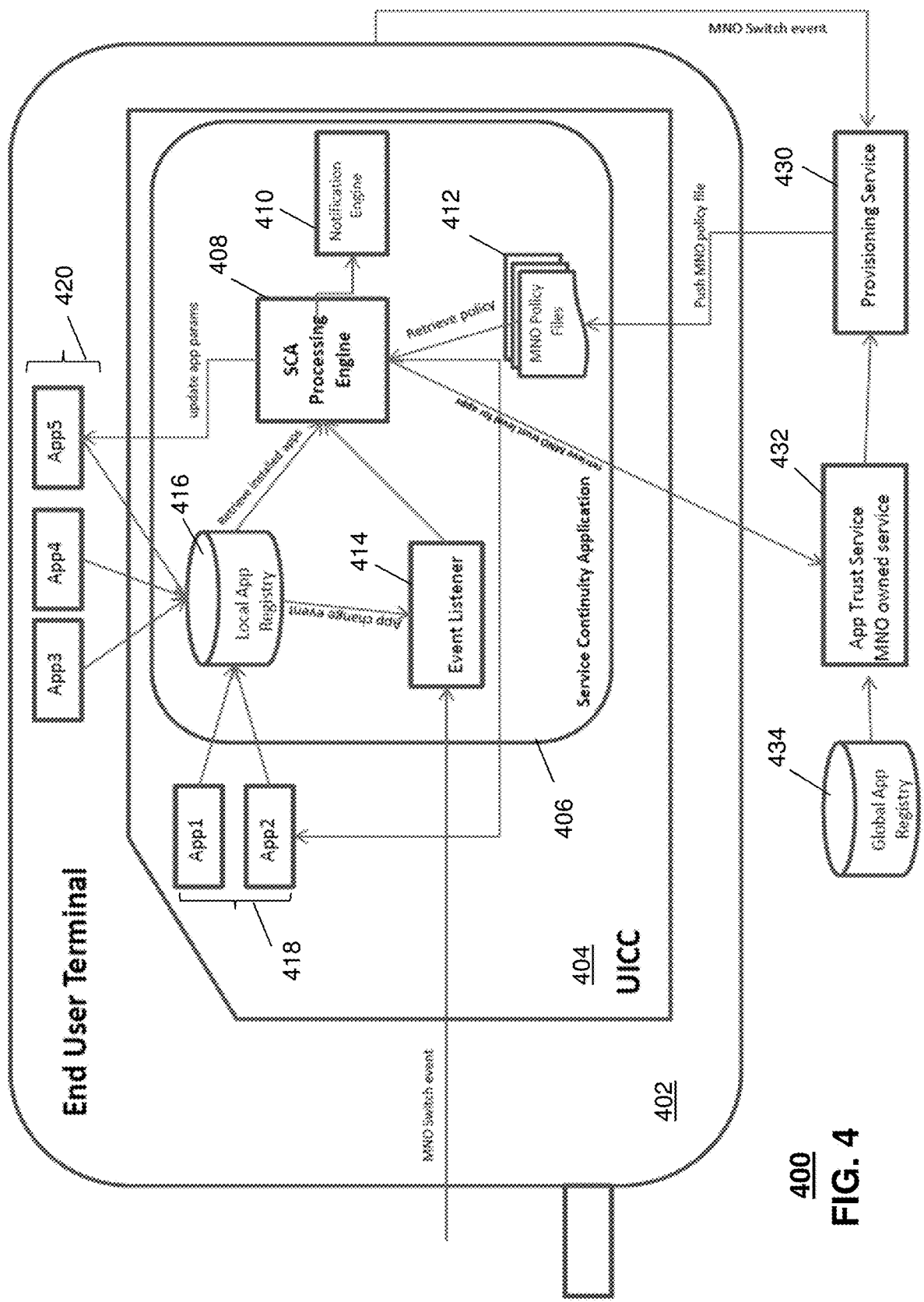
FIG. 4 depicts an illustrative embodiment of a communication device utilizing a Universal Integrated Circuit Card (UICC) to support among other things enablement of software applications operating from the communication device.

Subscribers such as consumers and business enterprises can invest in software applications such as described above. When a subscriber chooses to switch to a new MNO, the services of the new MNO may not operate in the same manner as the prior MNO, thereby causing interoperability issues with the software applications supported by the UICC 121. In one embodiment, the interoperability issues can be resolved with a communication device 400 configured with a UICC 404 that supports, among other things, operations of software applications operating from the communication device 400 as shown in FIG. 4.

Communication device 400 depicts an end user terminal 402 utilizing an UICC 404 with a service continuity application (SCA) 406. The SCA 406 can comprise a processing engine 408 that executes software modules such as a notification engine module 410, an MNO policy file system module 412, an event listener module 414, and a local application registry module 416 which can link to local software applications 418 executable by the UICC 402, and software applications 420 external to the UICC 402 and executable by a processor of the end user terminal 402.

The functional modules of the SCA 406 can be described as follows:

The processing engine 408 mediates interactions between functional modules of the SCA 406 and directs configuration updates to software applications resident in the UICC 402 or externally controlled by the UICC 402. The processing engine 408 can also send configuration updates to an MNO via a provisioning service 430, and an application trust service 432 having access to a global application registry 434 to identify software applications trusted by the MNO.

The notification engine module 410 can trigger external actions such as a device management session with the MNO's core network to initiate device provisioning, or information to be displayed to the user, such as ownership transfer instructions or advice on trust status of software applications.

The policy file system module 412 stores files provided by the MNO containing information necessary to ensure service continuity of user software applications such as network service configuration parameters, access and management permissions for user software applications utilizing MNO services, DRM rights certificate updates, and ownership transfer instructions.

The event listener module 414 detects a change from one MNO to another, as well as changes to the local application registry 416 indicating software applications were added or deleted.

The local application registry module 416 contains a mapping between all installed software applications and the network services and configuration parameters they require.

The SCA 406 can be installed in the end user terminal 402 by way of an embedded UICC 404 or removable UICC 404. The SCA 406 can be configured to monitor for MNO switch events. This is accomplished in the event listener module 414. The event listener module 414 is also responsible to react to application change events (add, delete, update, etc.) in order to trigger the processing/reprocessing of service continuity rules.

Software applications installed in the end user terminal 402 can be registered with the local application registry module 416. Upon receiving triggering events from the event listener module 414, the processing engine 408 can perform a trust lookup with the MNO trust service 432 to request the updated trust level for all local and external software applications 418, 420 operating from the UICC 404 or end user terminal 402 based on the MNO's own trust model. A software application can be considered trusted by one MNO but can be considered untrusted by another depending on factors determined by the MNO such as, for example, bandwidth utilization of the application, an identity of the author of the application, compliance with DRM rules, or other criteria deemed important to service personnel of the MNO.

The MNO provisioning service 430 can generate a new Device Policy Update (DPA) file during the transition process. MNO DPA files can be stored locally in the UICC 404 and can be updated based on the MNO switch event and an application change event detected by the MNO provisioning service 430. The processing engine 408 can be configured to cross reference installed software applications with an MNO Policy File to determine dependencies, and rules and to update the configuration settings of the software application.

Upon processing the rules and making all the necessary configuration updates to the affected software applications as defined by a policy file supplied by the MNO, the processing engine 408 can cause the notification engine module 410, as required, to trigger mechanisms to notify a user of the end user terminal 402, the MNO or third parties about the changes applied to the software application's configuration, and or trigger a device management session to initiate further device provisioning with provisioning service 430 of the MNO.

It should be noted that the end user terminal 402 depicted in FIG. 4 can be replaced with an integrated fixed-location communication device situated, for example, in the vending machine 206, the utility meter 208, the parking meter 210 or the vehicles 212 or 214 shown in FIG. 2.

Figure 5:
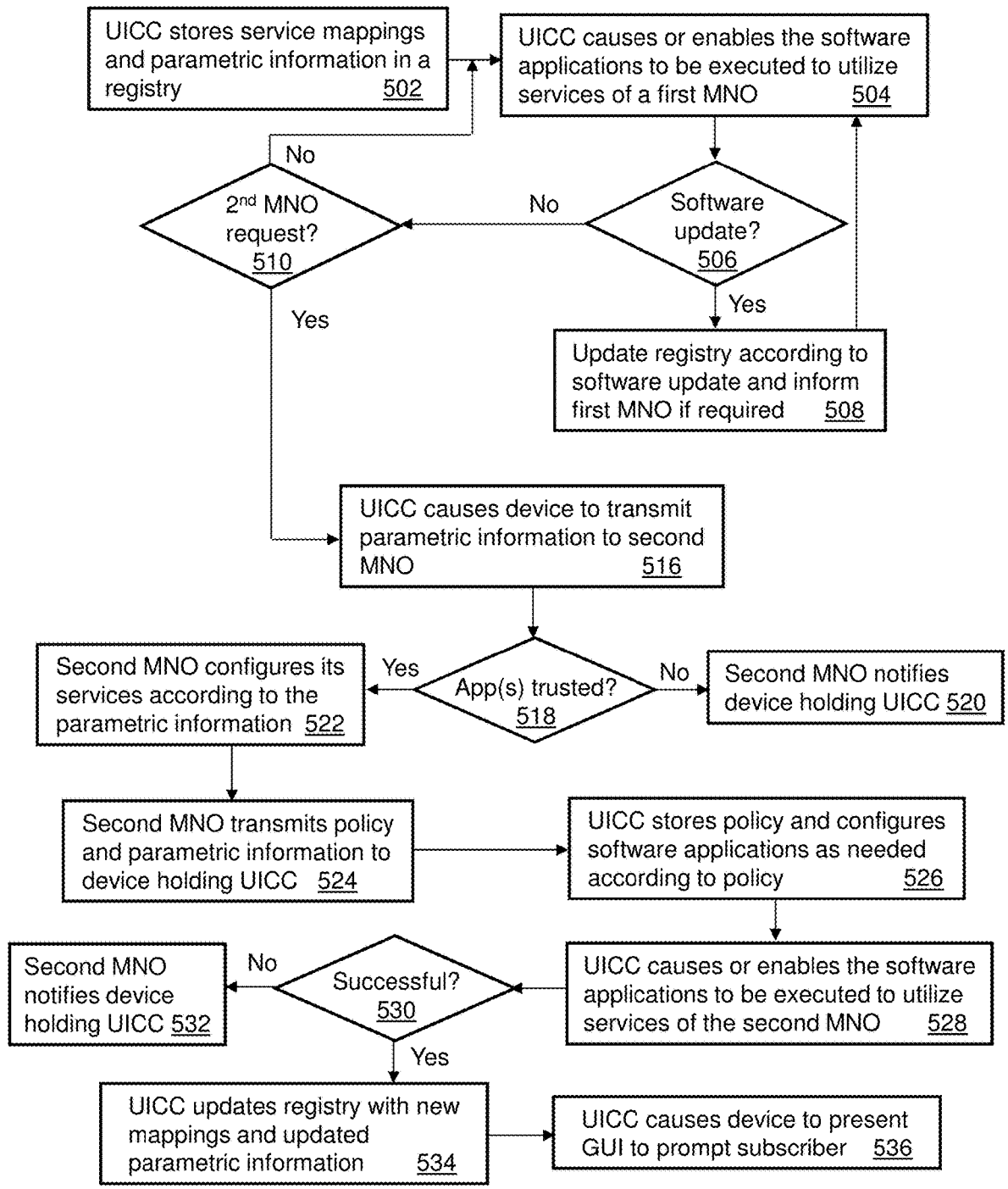
FIG. 5 depicts an illustrative embodiment of a method for transitioning services when switching between the MNOs of FIG. 2.

FIG. 5 depicts an illustrative embodiment of a method 500 for transitioning between services provided by the MNOs 202 and 204 of FIG. 2 utilizing, for example, the communication device 400 of FIG. 4. Method 500 can begin with step 502 in which the UICC 404 stores service mappings and parametric information in the local registry module 416. The mappings can represent service to software application mappings similar to those shown in FIG. 3. The parametric information can represent configuration information which is used by an MNO service to configure the service to interoperate with one or more of the software applications 418 and 420. The parametric information can also represent configuration information used to configure the software applications 418 and 420 in accordance with service policy information stored in the file system 412. In step 504, the UICC 404 can cause or enable all or some of the software applications 418 and 420 to be executed. At step 506, the UICC 404 can track when a software application update has taken place.

A software application update can represent a deletion of an existing software application, a modification, version update, or reconfiguration of an existing software application, or an addition of a new software application. The update of a software application can result from user input, external messages received by the end user terminal 402, or other suitable techniques for updating software applications supported by the UICC 404. If a software application update is detected at step 506, the UICC 404 can proceed to update the registry 416, and if needed, inform the MNO of the update by way of, for example, the provisioning service 430 and/or the application trust service 432.

If a software update has not been detected, the UICC 404 can proceed to step 510 where it monitors events for transitioning between MNOs (e.g., transitioning from MNO 202 to MNO 204 of FIG. 2). The transition between MNOs can be initiated by the subscriber at any time by, for example, establishing a new agreement with an MNO. If a transition event is not detected at step 510, the UICC 404 continues to execute or enable software applications as requested at step 504 and monitor software updates at step 506. If an MNO transition is detected, the UICC 404 can proceed to step 516 where the UICC transmits to the second MNO via the end user terminal 402 parametric information descriptive of software applications resident in the UICC 404 and external to the UICC 404.

The parametric information can include, for example, the names, versions, model no's, serial no's, or other identification data of the software applications along with information descriptive of the MNO services desired by each software application, and the operational features, conditions, or requirements necessary to configure the MNO services to interoperate with the software applications. At step 518, the second MNO can review by way of the application trust service 432 the identity of the software applications and determine if the software applications are trusted by the second MNO. Trust criteria can be established by the second MNO. Software applications that were trusted by the first MNO may not be trusted by the second MNO because, for example, personnel of the second MNO have determined that allowing a particular software application can cause network congestion, interoperability issues with the services of the second MNO, or the software application is not recognized by the second MNO, or has known defects that have not been mitigated to the satisfaction of personnel of the second MNO. Other criteria may be defined by the second MNO. Such criteria can be updated periodically and result in a previously trusted software application no longer being trusted.

If a software application is not trusted, the UICC 404 can proceed to step 520 where it generates a notification by way of, for example, the notification engine module 410. The notification may be submitted to the user of the end user terminal 402. The user can be presented, for example, with a GUI that informs the user that some services cannot be supported by the second MNO. For any and all software applications that have been determined to be trusted by the second MNO at step 518, the second MNO proceeds to step 522 where it configures its services by providing appropriate parametric information to the UICC 404.

At step 524, the second MNO transmits policy and parametric information to the UICC 404 which it stores in the MNO Policy files 412 at step 526. The policy information can represent usage policies for defining proper usage of services provided by the MNO, while the parametric information can include operational information such as server addresses for accessing services of the MNO. In the same step, the UICC 404 can utilize configuration information provided in the policy files to update the local registry module 416 and thereby configure operational parameters of the software applications. The configuration of the services of the second MNO and the policy information used to configure the software applications supported by the UICC 404 enables the software applications and the MNO services to be interoperable. At step 528, the UICC 404 can execute one or more local software applications 418 requested by user input or by automated schedules. Alternatively, the UICC 404 can enable by way of the configuration information stored in the registry 416 one or more external software applications 420 for execution by a processor of the end user terminal 402 according to user input detected thereby. If interactions between the MNO services and the software applications do not cause execution errors or trigger alarms at either the second MNO or the software applications, then the UICC 404 can proceed to step 534 to update the registry module 416 with new mappings and updated parametric data descriptive of the requirements set by the second MNO via the policy files.

The UICC 404 can also be configured to present at step 536 a GUI to prompt the subscriber if necessary. The prompt can present, for example, a new fee schedule for utilizing the MNO services if a fee agreement was not pre-arranged, or if new service options are offered by the second MNO. The prompt can also confirm to the subscriber that the transition was successful and that the software applications are successfully utilizing the MNO services. If, on the other hand, one or more software applications did not successfully interoperate with the MNO services, the new MNO can notify the UICC 404 at step 532 that an error has occurred. The UICC 404 can be configured to notify the subscriber of the issue and remain communicatively coupled to the second MNO while other software applications not having interoperability issues continue to be serviced by the second MNO. The subscriber can, among other things, contact personnel of the second MNO to address the error.

The foregoing embodiments provide a suitable solution for maintaining interoperability between MNO services and software applications during a transition between MNOs without requiring a replacement of the UICC.

Upon reviewing these embodiments, it would be evident to an artisan with ordinary skill in the art that said embodiments can be modified, reduced, or enhanced without departing from the scope and spirit of the claims described below. The UICC 404 and its functional modules can be integrated as software components of a microprocessor utilized by the communication device. In this embodiment, the microprocessor performs communication functions as well as the functions described above for the UICC without the additional hardware of a UICC. This embodiment can be referred to as a "soft" UICC configured according to the embodiments described herein. In the foregoing embodiments, the term "MNO" can be replaced with a Landline Network Operator (LNO). An LNO may support circuit switched or packet switched landline communications. In one embodiment, an end user terminal 402 configured with a landline interface (see transceiver 102 of FIG. 1) may be accessible by the LNO.

A UICC utilized by the end user terminal 402 with the landline interface can be configured to perform the functions of method 500 for maintaining service continuity when transitioning between LNOs. In another embodiment, an end user terminal 402 capable of landline and wireless communications, can include a UICC configured for maintaining service continuity for LNO to MNO transitions, and vice-versa. Accordingly, method 500 can be adapted for maintaining service continuity between network operators of various access technologies.

Method 500 can be further modified to include steps for convey credentials of the MNO's (or LNO's) to the UICC to facilitate establishment of communications between the UICC and an MNO. The credentials can be submitted to the UICC from service equipment that manages distribution of credentials to UICC's. The service equipment can be operated by the MNO's or a third party. The service equipment can be accessible to the communication device utilizing the UICC by way of a wireless or wired interface of a communication system communicatively coupled to the service equipment. In one embodiment, the MNO (or LNO) credentials can be pre-stored in the registry of the UICC.

Other embodiments are contemplated by the subject disclosure.

Figure 6:
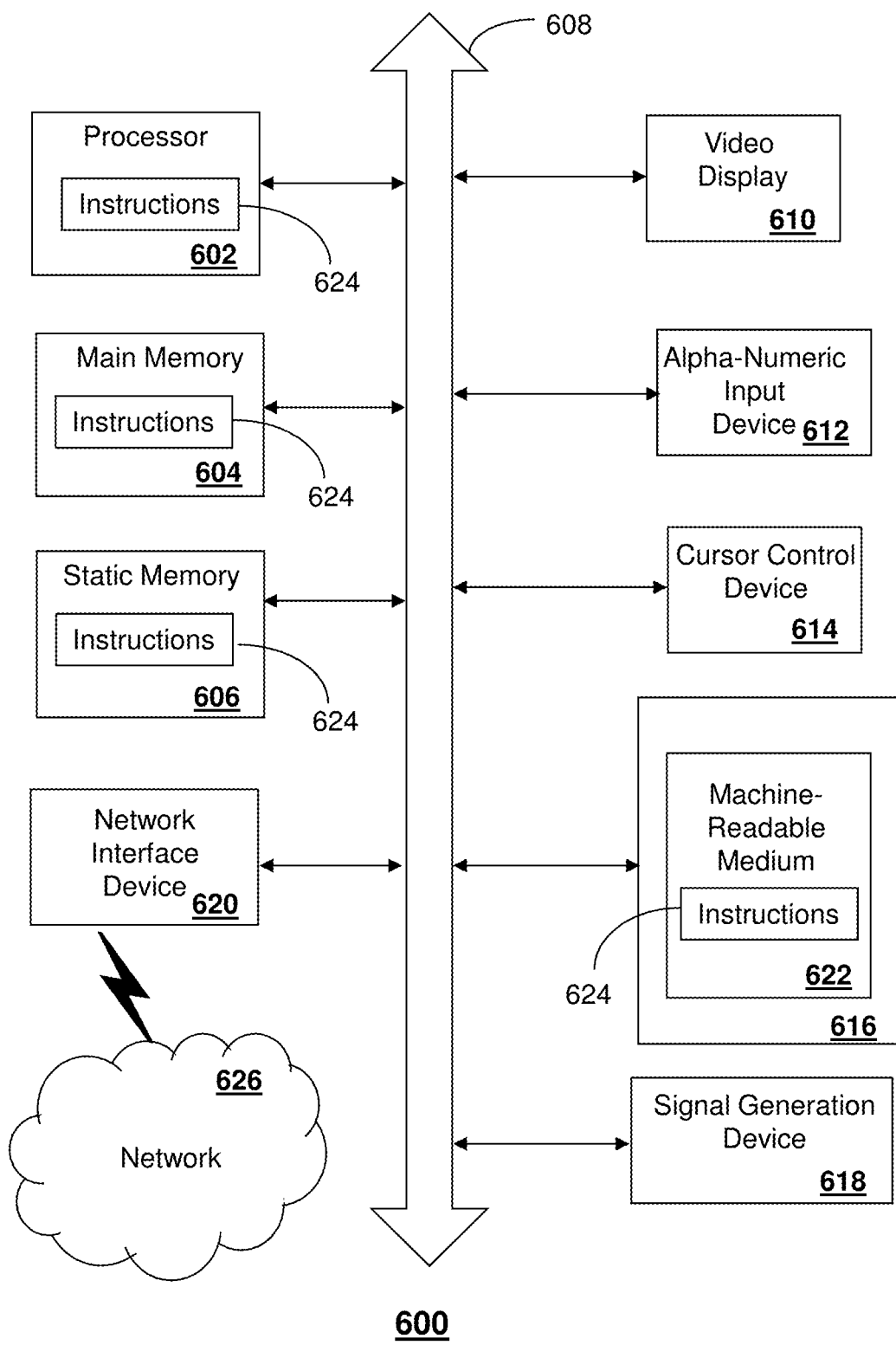
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods discussed above. One or more instances of the machine can operate, for example, as the communication devices 100 and 400 of FIGS. 1 and 4, and their respective subcomponents, such as the UICC. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, ZigBee), and long-range communications (e.g., WiMAX, GSM, CDMA, LTE) are contemplated for use by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processing system including a processor of a universal integrated circuit card; and
   a memory that stores executable instructions that, when executed by the processing system, facilitate performance of operations comprising:
   enabling a plurality of software applications executable by the universal integrated circuit card or a user terminal communicatively coupled to the universal integrated circuit card to utilize services provided by equipment of a first network operator;
   transmitting, to equipment of a second network operator, first parametric information descriptive of operational features of the plurality of software applications, wherein the equipment of the second network operator configures a plurality of services provided by the equipment of the second network operator, wherein the plurality of services are configured in accordance with the first parametric information, and wherein the plurality of services are configured to interoperate with the plurality of software applications;
   detecting that a first software application of the plurality of software applications has been authorized for use by the equipment of the second network operator;
   configuring operational parameters of the first software application based on second parametric information received from the equipment of the second network operator concerning the plurality of configured services; and
   updating a mapping of operational parameters between each of the plurality of software applications and the plurality of configured services.

2. The device of claim 1, wherein the updating is responsive to detecting one of an installation of an additional software application, a removal or disablement of one of the plurality of software applications, or a change in configurable information associated with one of the plurality of software applications.

3. The device of claim 1, wherein the first software application is resident on the universal integrated circuit card.

4. The device of claim 3, wherein the operations further comprise directing a configuration update to the first software application.

5. The device of claim 1, wherein the detecting that the first software application has been authorized for use by the equipment of a second network operator is based on an identification of which software applications of the plurality of software applications meet trust criteria established by the second network operator.

6. The device of claim 5, wherein the identification is performed by an application trust service operating external to the user terminal.

7. The device of claim 1, wherein the operations further comprise receiving from the equipment of the second network operator policy information regarding usage of the configured services.

8. The device of claim 7, wherein the operations further comprise storing the updated mapping and the policy information in a registry.

9. The device of claim 8, wherein the operations further comprise:

updating the second parametric information in accordance with the policy information; and storing the updated second parametric information in the registry.

10. The device of claim 1, wherein the operations further comprise initiating at the user terminal a presentation of a graphical user interface including information associated with the configured services.

11. A method comprising:

enabling, by a processing system including a processor of a universal integrated circuit card, a plurality of software applications executable by the universal integrated circuit card or a device communicatively coupled to the universal integrated circuit card to utilize services provided by equipment of a first network operator;

transmitting, by the processing system to equipment of a second network operator, first parametric information descriptive of operational features of the plurality of software applications, wherein the equipment of the second network operator configures a plurality of services provided by the equipment of the second network operator, wherein the plurality of services are configured in accordance with the first parametric information, and wherein the plurality of services are configured to interoperate with the plurality of software applications;

detecting, by the processing system, that a first software application of the plurality of software applications has been authorized for use by the equipment of the second network operator;

configuring, by the processing system, operational parameters of the first software application based on second parametric information received from the equipment of the second network operator concerning the configured services; and updating, by the processing system, a mapping of operational parameters between each of the plurality of software applications and the configured services, wherein the updating is responsive to detecting one of an installation of an additional software application, a removal or disablement of one of the plurality of software applications, or a change in configurable information associated with one of the plurality of software applications.

12. The method of claim 11, wherein the detecting that the first software application has been authorized for use by the equipment of a second network operator is based on an identification of which software applications of the plurality of software applications meet trust criteria established by the second network operator.

13. The method of claim 11, further comprising receiving, by the processing system, from the equipment of the second network operator policy information regarding usage of the configured services.

14. The method of claim 13, further comprising storing, by the processing system, the updated mapping and the policy information in a registry.

15. The method of claim 14, further comprising:

updating, by the processing system, the second parametric information in accordance with the policy information; and storing, by the processing system, the updated second parametric information in the registry.

16. A non-transitory machine-readable medium comprising executable instructions that, when executed by a processing system including a processor of a universal integrated circuit card, facilitates performance of operations comprising:

enabling a plurality of software applications executable by the universal integrated circuit card or a device communicatively coupled to the universal integrated circuit card to utilize services provided by equipment of a first network operator;

transmitting, to equipment of a second network operator, first parametric information descriptive of operational features of the plurality of software applications, wherein the equipment of the second network operator configures a plurality of services provided by the equipment of the second network operator, wherein the plurality of services are configured in accordance with the first parametric information, and wherein the plurality of services are configured to interoperate with the plurality of software applications;

detecting that a first software application of the plurality of software applications has been authorized for use by the equipment of the second network operator;

configuring operational parameters of the first software application based on second parametric information received from the equipment of the second network operator concerning the plurality of configured services; and updating a mapping of operational parameters between each of the plurality of software applications and the plurality of configured services, wherein the updating is responsive to detecting one of an installation of an additional software application, a removal or disablement of one of the plurality of software applications, or a change in configurable information associated with one of the plurality of software applications.

17. The non-transitory machine-readable medium of claim 16, wherein the first software application is resident on the universal integrated circuit card.

18. The non-transitory machine-readable medium of claim 16, wherein the detecting that the first software application has been authorized for use by the equipment of a second network operator is based on an identification of which software applications of the plurality of software applications meet trust criteria established by the second network operator.

19. The non-transitory machine-readable medium of claim 16, wherein the operations further comprise:

receiving from the equipment of the second network operator policy information regarding usage of the configured services; and storing the updated mapping and the policy information in a registry.

20. The non-transitory machine-readable medium of claim 16, wherein the operations further comprise initiating at the device a presentation of a graphical user interface including information associated with the configured services.

* * * * *